(12) United States Patent
Moller et al.

(10) Patent No.: US 9,701,042 B2
(45) Date of Patent: Jul. 11, 2017

(54) METHOD OF MAKING DIAMOND MINING CORE DRILL BIT AND REAMER

(71) Applicant: DIAMOND PRODUCTS, LIMITED, Elyria, OH (US)

(72) Inventors: Karl H. Moller, North Palm Beach, FL (US); Thomas G. Ruffner, Oberlin, OH (US)

(73) Assignee: Diamond Products, Limited, Elyria, OH (US)

( * ) Notice: Subject to any disclaimer, the term of this patent is extended or adjusted under 35 U.S.C. 154(b) by 314 days.

(21) Appl. No.: 14/316,934

(22) Filed: Jun. 27, 2014

(65) Prior Publication Data

US 2015/0007505 A1    Jan. 8, 2015

Related U.S. Application Data

(60) Provisional application No. 61/842,658, filed on Jul. 3, 2013, provisional application No. 61/911,521, filed on Dec. 4, 2013.

(51) Int. Cl.
*B23K 26/00* (2014.01)
*B28D 1/04* (2006.01)
*B23K 11/26* (2006.01)
*B23K 26/28* (2014.01)
*E21B 10/48* (2006.01)
*B23K 101/00* (2006.01)

(52) U.S. Cl.
CPC .............. *B28D 1/041* (2013.01); *B23K 11/26* (2013.01); *B23K 26/28* (2013.01); *E21B 10/485* (2013.01); *B23K 2201/002* (2013.01)

(58) Field of Classification Search
CPC ........ B24D 18/00; B24D 1/041; B23K 26/28; B23K 11/26; B23K 2201/002
USPC .... 175/58, 325.3, 393, 405.1, 408; 219/105, 219/121.63, 121.64, 121.78
See application file for complete search history.

(56) References Cited

U.S. PATENT DOCUMENTS

| | | |
|---|---|---|
| 2,543,861 A | 3/1951 | Mader |
| 2,662,738 A | 12/1953 | Davis et al. |
| 2,738,167 A | 3/1956 | Williams, Jr. |
| 2,996,061 A | 8/1961 | Miller |
| 3,113,626 A | 12/1963 | Salisbury et al. |
| 3,412,813 A | 11/1968 | Johnson |
| 3,464,655 A | 9/1969 | Schuman |
| 3,537,538 A | 11/1970 | Generoux |
| 3,736,995 A | 6/1973 | Salter |
| 3,802,130 A | 4/1974 | Lindenbeck |

(Continued)

FOREIGN PATENT DOCUMENTS

| | | |
|---|---|---|
| EP | 0352546 A2 | 1/1990 |
| EP | 2177303 A1 | 4/2010 |
| JP | 2004-63331 | * 2/2004 |

*Primary Examiner* — Thien S Tran
(74) *Attorney, Agent, or Firm* — Rankin, Hill & Clark LLP

(57) ABSTRACT

A method of making a combination tool including a mining drill bit and reamer. The combination tool includes drill bit body having a plurality of cutting segments attached thereto, a reamer body having a plurality of reaming segments attached thereto, and the drill bit body and the reamer body being configured to selectively attach to the one another. The cutting segments and reamer segments being attached by laser welding to the drill bit body and reamer body, respectively.

25 Claims, 8 Drawing Sheets

(56) References Cited

U.S. PATENT DOCUMENTS

| | | | |
|---|---|---|---|
| 3,833,077 A * | 9/1974 | Lavallee | E21B 17/1078 175/325.2 |
| 4,001,543 A * | 1/1977 | Bove | B23K 26/067 219/121.63 |
| 4,128,136 A | 12/1978 | Generoux | |
| 4,208,154 A | 6/1980 | Gundy | |
| 4,445,580 A * | 5/1984 | Sahley | E21B 10/003 175/404 |
| 4,686,080 A * | 8/1987 | Hara | B23B 27/20 228/122.1 |
| 4,711,609 A | 12/1987 | Seefluth | |
| 5,069,584 A | 12/1991 | Obermeier et al. | |
| 5,393,175 A | 2/1995 | Courville | |
| 5,433,281 A * | 7/1995 | Black | E21B 10/58 175/420.1 |
| 5,590,729 A | 1/1997 | Cooley et al. | |
| 5,601,736 A * | 2/1997 | Saitoh | B23K 26/26 219/105 |
| 5,653,812 A | 8/1997 | Petrmichl et al. | |
| 5,996,571 A * | 12/1999 | Jedick | B28D 1/041 125/20 |
| 6,209,420 B1 | 4/2001 | Butcher et al. | |
| D466,139 S | 11/2002 | Kim et al. | |
| 6,588,520 B2 * | 7/2003 | Hauptmann | B23B 51/02 175/398 |
| 6,595,844 B1 | 7/2003 | Mizuno et al. | |
| D481,045 S | 10/2003 | Ahn | |
| 6,742,611 B1 | 6/2004 | Illerhaus et al. | |
| 6,846,341 B2 | 1/2005 | Middlemiss | |
| 6,868,848 B2 | 3/2005 | Boland et al. | |
| 6,904,984 B1 * | 6/2005 | Estes | E21B 10/5735 175/430 |
| 7,204,244 B1 | 4/2007 | Pedersen | |
| 7,641,004 B2 | 1/2010 | Lapointe | |
| 8,210,287 B1 | 7/2012 | Moller et al. | |
| 2003/0029296 A1 | 2/2003 | Donazzan | |
| 2007/0251727 A1 * | 11/2007 | DeVall | E21B 10/43 175/57 |
| 2008/0101977 A1 * | 5/2008 | Eason | B22F 7/062 419/38 |
| 2009/0022560 A1 | 1/2009 | Liemke | |
| 2010/0086371 A1 * | 4/2010 | Mergenthaler | B23B 47/34 408/59 |
| 2010/0170720 A1 | 7/2010 | Baril et al. | |
| 2012/0061146 A1 * | 3/2012 | Pearce | E21B 10/02 175/58 |
| 2012/0176020 A1 * | 7/2012 | Quitmeyer | H01T 21/02 313/141 |

* cited by examiner

METHOD OF MAKING DIAMOND MINING CORE DRILL BIT AND REAMER

CROSS-REFERENCE TO RELATED APPLICATIONS

The present application claims benefit from U.S. Provisional Patent Application Ser. No. 61/842,658 filed Jul. 3, 2013 and U.S. Provisional Patent Application Ser. No. 61/911,521 filed Dec. 4, 2013, which are incorporated herein by reference.

FIELD OF THE INVENTION

The present application relates to methods of making diamond cutting tools. More particularly, the present application concerns new and improved methods of making diamond mining core drill bits and reamers for cutting and reaming rock and earth.

BACKGROUND OF THE INVENTION

Diamond core drilling equipment is used extensively to drill circular or annular holes in rock, earth, and related materials for a variety of reasons. For example, holes are drilled in rock during mining or during exploration for purposes of determining soil compaction, determining soil percolation or to perform other geological research.

Prior art diamond core drill bits or hole saws of a general type that are commonly used in mining applications have cutting segments of such bits that are commonly attached using infiltration techniques.

Generally speaking, diamond core drilling equipment comprises a motor-driven core drill assembly including a down-hole mining core drill bit or hole saw. The core drill assembly may embody various configurations, but such assembly generally comprises a base and a guide column extending up from the base or a drilling rig. A carriage may be provided between the column and the motor for guiding the motor along the column as the pipe extensions and mining core drill bit are advanced beneath the ground surface. Generally, the core bit is attached to the pipe extensions using a driver or reaming tool.

The prior art provides various types of core drill bits for use in mining. However, the majority of commercial mining bits used today have cutting heads formed of a diamond impregnated (infiltrated) material. More particularly, the cutting head comprises a plurality of cutting segments or teeth mounted at the distal end of the cylindrical body of the bit. Each of the segments normally has a uniform concentration of diamond particles dispersed throughout the segments and is attached to the cylindrical body of the bit using an infiltration process.

This attachment process, however, is a time consuming operation, it is costly, and may at times result in inadequate adhesion of the segments with the body especially when the segments are highly loaded with diamond particles. Often, the infiltrated material "drips" onto unintended portions of the body and must be cleaned afterwards or fails to adhere properly to the diamond impregnated cutting segments. A substantial investment of energy and time may be required to clean the tool of the stray brazing material and to properly adhere each cutting segment. Additionally, the uniform dispersion of diamonds in the cutting segments may produce only adequate drilling efficiency.

BRIEF SUMMARY OF THE INVENTION

The present invention provides new and improved methods of making diamond mining core drill bits and reamers for cutting and reaming annular holes in rock, earth, and similar materials. The drill bit, reamer, and method of making the drill bit and reamer provide several distinct advantages over the bits, reamers, and methods of the prior art. More particularly, the present invention provides a drill bit and reamer with a cutting head securely mounted to the drill bit body and provides reaming segments securely mounted to the reamer.

The cutting head on the drill bit produced by the methods herein, constitutes a plurality of cutting segments attached to the drill bit body. The mid-section of the reamer produced by the methods herein, constitutes a plurality of reaming segments attached to the reamer body. The cutting segments and reaming segments each include a concentration of diamond particles dispersed therein. The present invention provides methods for constructing a diamond mining core drill bit and reamer that is simpler than the prior art methods and provides a lower cost drill bit and reamer that exhibit better adhesion or coupling between the body of the drill bit and the one or more cutting segments and also between the reamer body and reaming segments. The methods of the present invention also allow for the use of segments having varied compositions without concern for loss of bond integrity as between the segments and the body. Bits and reamers having this construction have a lower production cost and exhibit a truer cut, better tracking, and a longer life as compared to prior art bits and reamers.

In one embodiment, a method of making a combination mining drill bit and reamer is provided. The method comprises providing a hollow cylindrical drill bit body having a first end section and an opposite second end section; providing a hollow cylindrical reamer body having a first end and an opposite second end and a mid-section between the first end and the second end; providing a plurality of cutting segments having diamond particles dispersed therein; and providing a plurality of reaming segments having diamond particles dispersed therein. The method also includes laser welding the cutting segments to the second end section of the drill bit body to thereby form a laser weld zone at an interface between the cutting segments and the second end section. The method also includes laser welding the reaming segments to the outside of the reamer body at the mid-section to thereby form a laser weld area at an interface between the reaming segments and the mid-section. The method further includes attaching the first end section of the drill bit body to the second end of the reamer body.

In another embodiment, a method of making a combination mining drill bit and reamer includes providing a hollow cylindrical body having a first end section, an opposite second end section and a mid-section; providing a plurality of cutting segments having diamond particles dispersed therein; and providing a plurality of reaming segments having diamond particles dispersed therein. The first end section of the drill bit body is configured to selectively attach to a drill pipe or driver for rotating the combination mining drill bit and reamer relative to an associated material. The method includes laser welding the cutting segments to the second end section of the body to thereby form a laser weld zone at an interface between the cutting segments and the second end section. The method also includes welding the reaming segments to the body at the mid-section to thereby form a weld area at an interface between the reaming segments and the mid-section.

In another embodiment, a method of making a mining drill bit is provided. The method comprises providing a hollow cylindrical body having a first end section, an opposite second end section and a mid-section; providing a plurality of cutting segments having diamond particles dispersed therein; and providing a plurality of reaming segments having diamond particles dispersed therein. The method further includes laser welding the cutting segments to the second end section along both an inside radius of the second end section and the outside radius of the second end section to thereby form a laser weld zone at an interface between the cutting segments and the second end section.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

The foregoing aspects and others will be pointed out more fully hereinafter in conjunction with the written description of the various embodiments of the invention illustrated in the accompanying drawings in which.

DETAILED DESCRIPTION OF THE INVENTION

Figure 1:
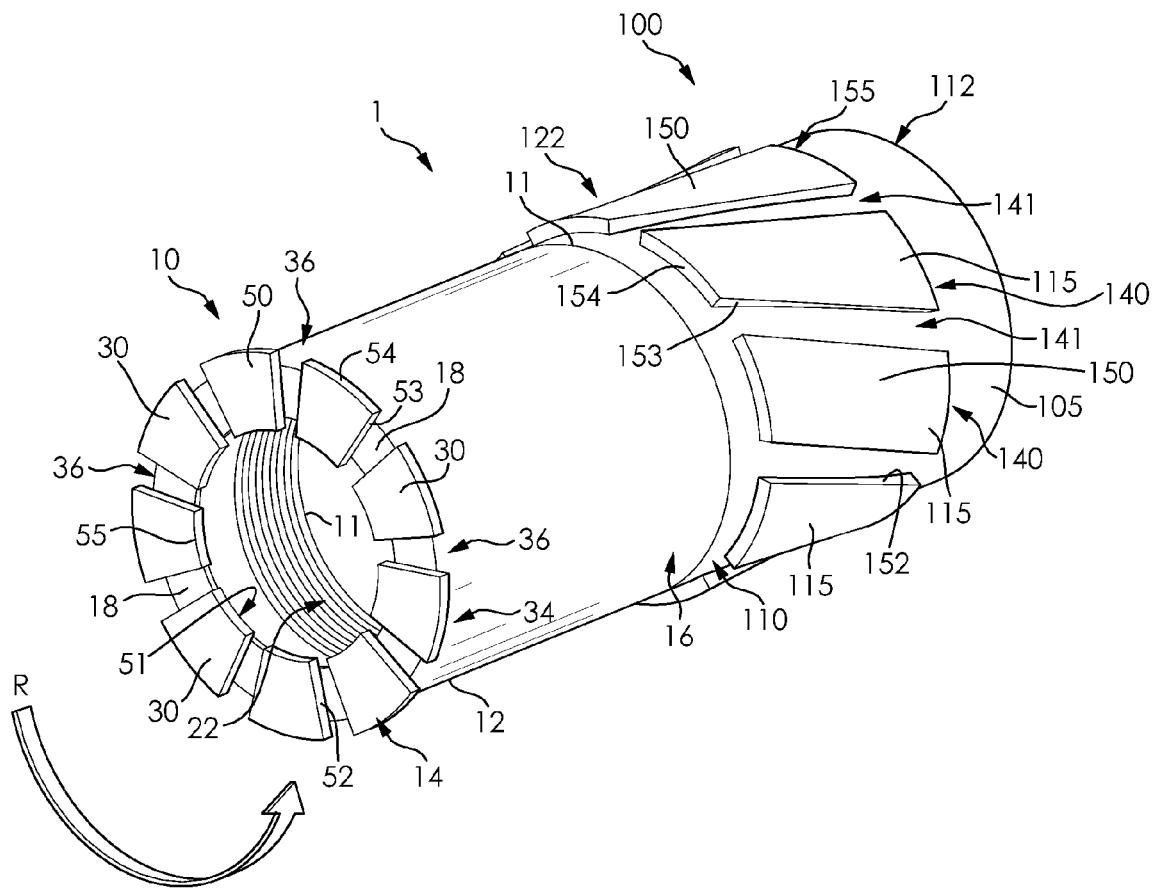
FIG. 1 is a schematic perspective view of a combination mining drill bit and reamer made in accordance with the present subject matter.
Figure 2:
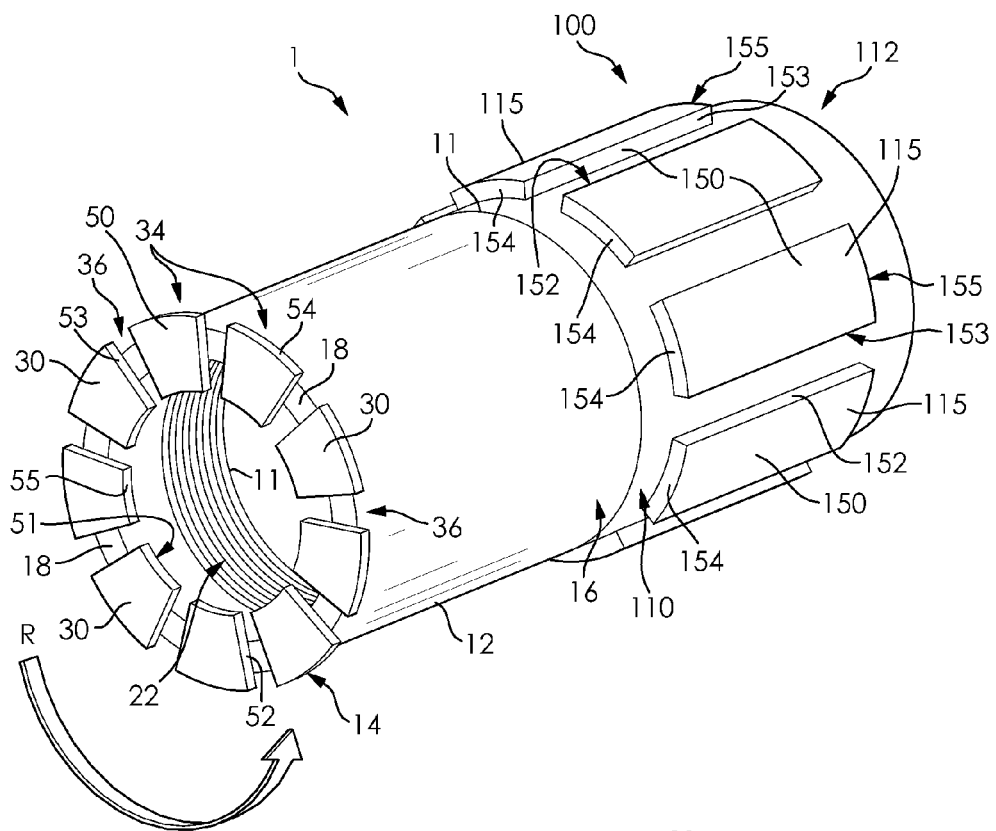
FIG. 2 is a schematic perspective view of a combination mining drill bit and reamer made in accordance with the present subject matter.
Figure 3:
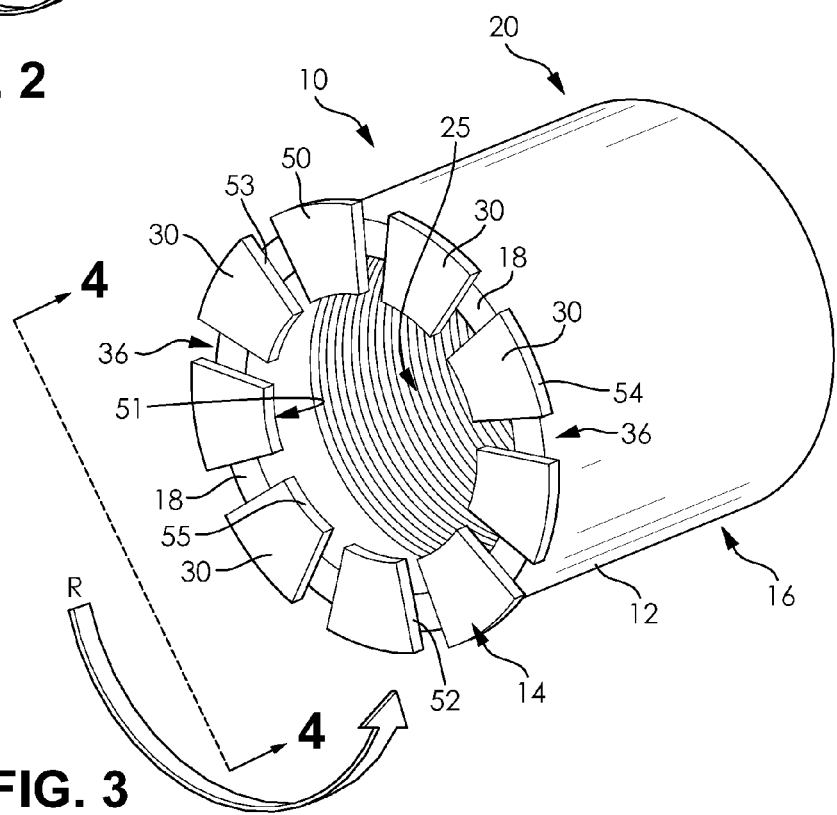
FIG. 3 is a schematic perspective view of a mining drill bit made in accordance with the present subject matter.

The present invention provides new and improved methods of making a combination mining core bit and reamer. Referring now to the drawings wherein the showings are for purposes of illustrating non-limiting examples of exemplary embodiments of the invention only, and not for purposes of limiting same, and initially to FIGS. 1 and 2, there is shown the combination mining tool 1 comprising a diamond mining core drill bit 10 and reamer 100 made by methods of the present invention. In the various Figures the same reference numerals have been used to identify similar elements. In FIG. 1, the tool 1 has slanted or angled reaming segments 115 that have a major dimension being a parallelogram, wherein a top face 150 of each of the reaming segments 115 have a shape that is a parallelogram. In FIG. 2, the tool 1 has straight reaming segments 115 that have a major dimension being a rectangle, wherein a top face 150 of each of the reaming segments 115 have a shape that is a rectangle.

In one embodiment, the combination mining tool 1 comprises a drill bit 10 attached to a separate and distinct reamer 100 as depicted in FIG. 1, showing a joint 11 between the separate and distinct drill bit 10 and reamer 100. In another embodiment not shown, the combination mining tool 1 comprises an integral drill bit and reamer in one unitary tool. More specifically, the tool is formed from a hollow cylindrical body having a first end section, an opposite second end section and a mid-section. Cutting segments may be attached to the second end section, reaming segments may be attached to the mid-section, and the first end section may be configured to be selectively attached to a driver or drill pipe for rotating the combination mining drill bit and reamer. This unitary drill bit and reamer can be a tool similar to that shown in FIG. 1, but wherein the joint 11 between the drill bit 10 and reamer 100 is eliminated, wherein a single hollow cylindrical body is used to make the tool. The two portions of the tool, i.e. the drill bit 10 and the reamer 100, will be described separately herein.

Drill Bit

With reference to FIGS. 1-5, the drill bit 10 made in accordance with the present methods comprises an elongated hollow cylindrical body 12 and a cutting head 14 formed on one distal end 18 of the body 12. The body 12 of the drill bit 10 can be commonly formed of steel as is conventional in the mining drill industry. The cutting head 14 comprises a plurality of cutting segments 30. Each cutting segment 30 has a top face 50, a bottom face 51, a leading face 52, a trailing face 53, an outer face 54, and an inner face 55, all of which will be discussed in more detail herein. The bottom face 51 comprises a connecting portion 38 that is welded to the body 12.

A second end section 18 of the body 12 is defined by a portion of the body 12 that is joined to a connecting portion 38 of the cutting segments 30, along with portions of the body 12 located therebetween. Concurrently, the connecting portion 38 of the cutting segments 30 is defined by the portion of the bottom face 51 that is joined to the second end section 18 of the body 12.

The second end section 18 has a surface area that can be defined by square units of measurement, e.g. square inches, square centimeters, etc. This surface area can be calculated for example, by determining the area of a circle having a radius equal to the outside radius of the drill bit body at the second end section and subtracting the area of a circle having a radius equal to the inside radius of the drill bit body at the second end section. In one embodiment of an assembled mining core drill bit, the surface area of the portion of the second end section that attaches to the connecting portion 38 of the one or more cutting segments 30 is about 25% to about 95% of the total surface area of the second end section 18, and preferably from about 60% to about 90%.

In embodiments where the drill bit 10 is separate and distinct from the reamer 100, the drill bit 10 also comprises a first end section 16 on the opposite distal end of the body 12 from the second end section 18. The first end section 16 has an attaching portion 20 comprising a plurality of female threads 25 for selectively attaching the core drill bit 10 to an associated driver such as, for example, a separate and distinct reamer 100 or drill pipe for rotating the tool in relation to an associated material to be drilled. In one embodiment, the attaching portion 20 comprises an internal threaded portion 28 as illustrated in the FIGS. 3 and 5. The internal threaded portion 28 enables the subject drill bit 10 to be selectively connected to an associated reamer 100, drill pipe, or driving member, having a corresponding external threaded portion.

Figure 5:
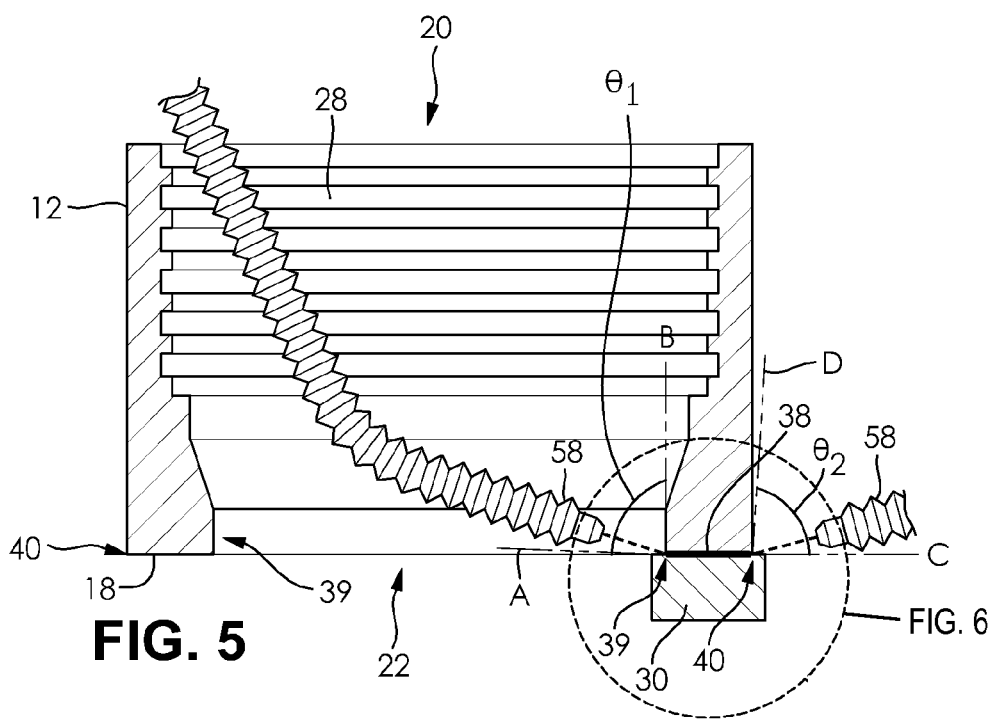
FIG. 5 is a cross-sectional view of a mining drill bit taken along line 5-5 of FIG. 4 showing a cutting segment being laser welded to the drill bit body.

The body 12 has a length defined by the distance from the distal end at the first end section 16 to the distal end at the second end section 18. The hollow body 12 has a thickness defined by the distance between the opposite sides (i.e. inside and outside surfaces) of the hollow body. In other words, the thickness of the body is the difference between the inside radius and the outside radius of the cylindrical body 12. The thickness of the body 12 may vary as shown in FIG. 5. In other words, the thickness of the body 12 at the first end section 16 may be different than the thickness of the body 12 at the second end section 18, as shown. Alternatively, the thickness of the body 12 may be uniform throughout.

Further, the cylindrical body 12 defines a circular hole or opening 22 therethrough so that the drill bit may function as a coring drill bit to remove or extract materials such as, for example, soil samplings, and/or rock or other formations. Also, the opening 22 at the first end section 16 enables access to the attaching portion 20.

With continued reference to FIGS. 1-5, and in an exemplary embodiment, the cutting head 14 of the subject drill bit 10 comprises a plurality of separate and distinct cutting segments 30 mounted to the second end section 18 of the body 12 such that the cutting head 14 and the body 12 are one unitary piece. However, it will be appreciated that one could form bit 10 by welding cutting segments to a drill bit body. As shown in FIGS. 1-5, and in relation to the direction of rotation R of the drill bit 10, the cutting segments 30 each have a top face 50, a bottom face 51 comprising the connecting portion 38, a leading face 52, a trailing face 53, an outer face 54, and an inner face 55.

The cutting segments 30 have a height, a width, and a length measurement. When referring to the height of the cutting segments, it is meant the average of the largest and smallest measurements between the top face 50 and the bottom face 51. When referring to the width of the cutting segments, it is meant the average of the largest and smallest measurements between the outer face 54 and the inner face 55. When referring to the length of the cutting segments, it is meant the average of the largest and smallest measurements between the leading face 52 and the trailing face 53. It will be understood that respective opposite faces of the cutting segments, i.e. top and bottom, outer and inner, and leading and trailing, can be but are not necessarily parallel to each other, and the cutting segments can be irregularly shaped in accordance with the present subject matter, such as wedge or pie shaped. The shape and dimensions of the segment are generally configured to meet the desired drilling application.

Figure 7A:
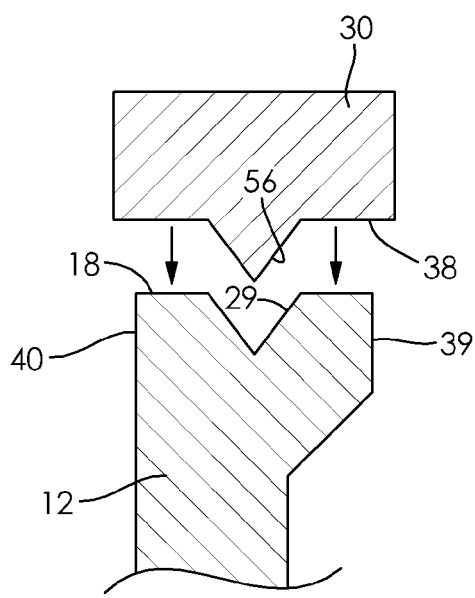
FIGS. 7a-7b are cross-sectional views of a mining drill bit showing various configurations of a second end section and corresponding cutting segment having mating surfaces before the cutting segment is mated and welded to the second end section.
Figure 7B:
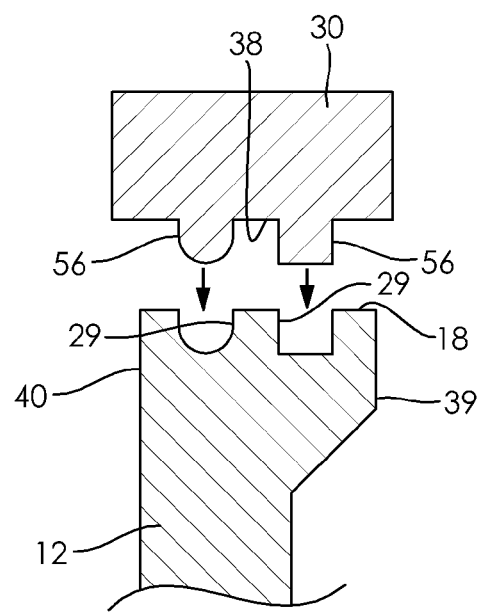
Figure 8:
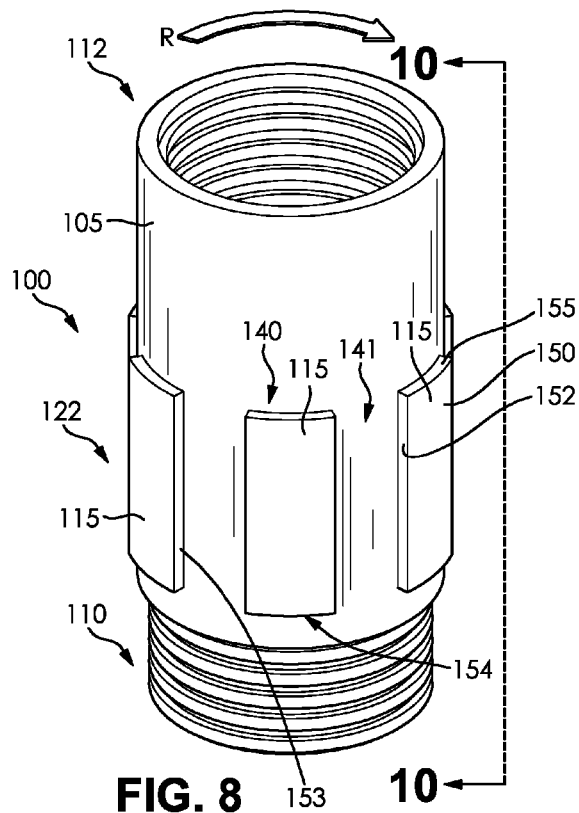
FIG. 8 is a schematic perspective view of a reamer made in accordance with the present subject matter.

In one embodiment as shown in FIGS. 7a and 7b, the connecting portion 38 of the cutting segments 30 include one or more protrusions 56 that protrude from the connecting portion. The protrusions are integral with the cutting segments and are formed in the cutting segments during cutting segment formation, for example by using a mold that forms such protrusions. In one embodiment, the one or more protrusions 56 comprise continuous ridges extending between the leading and trailing face or between the inside and outside faces of the cutting segments 30. The ridges can have a pointed, rounded, or rectangular cross-sectional shape. In another embodiment, the protrusions 56 are not continuous but comprise discontinuous pegs or knobs that are separated by flat land areas between them on the connecting portion 38. In any event, the protrusions 56 mate with, sit inside, and/or fit within one or more correspondingly shaped and sized recesses 29 in the second end section 18 of the drill bit body 12. The recesses 29 are formed in the second end section by milling, machining, or integrally casting techniques.

The protrusions 56 can have any shape or form such as for example, those depicted in FIGS. 7a and 7b, but are not limited to such forms as those depicted. The recesses 29 have a shape or form corresponding to that of the protrusions 56. In one embodiment, the protrusions are in the shape of a pointed ridge, having a cross-sectional shape of which is depicted in FIG. 7a. In this embodiment, the ridge projects outwardly from the bottom face 51 and extends from a leading 52 to a trailing face 53 of the cutting segment 30. The pointed ridge sits inside and/or mates with a correspondingly shaped and sized recess 29 on the second end section 18 of the drill bit body 12. In this embodiment, the recess is a pointed annular groove extending around the circumference of the second end section 18. In another aspect, the protrusion 56 and recess 29 can be oriented perpendicular to that just described, wherein the protrusions extends from the outer face 54 to the inner face 55 on the connecting portion 38, and the recess comprises pointed grooves circumferentially spaced on the second end section and radially extending from the inside radius 39 of the second end section to the outside radius 40 of the second end section.

When the cutting segments are welded to the body, the protrusions 56 fit within the recesses 29 such that during laser welding, material that forms the protrusions will melt and more thoroughly integrate with the melted material that forms the recess, and vice versa. This as to allow more material to mix between the cutting segments and the body than compared to welding flat surfaces together, and thereby may form a more durable bond. The integration of material between the protrusions 56 and recesses 29 may provide a stronger welded bond between the cutting segments 30 and the second end section 18 and may prevent detachment of the cutting segments from the drill bit body during drilling operations.

As with conventional bits, the cutting segments 30 are slightly wider than a thickness of the hollow cylindrical body 12 at the second end section 18 as shown in FIGS. 1-7, and 13 so as to provide sufficient clearance for the body during mining, drilling, or cutting operations. In one embodiment, the cutting segments have a width that is about 1.0 to about 2 times the thickness of the body 12 at the second end section 18. In one aspect, the cutting segments have a width that is about 1.2 to about 1.8 times the thickness of the body at the second end section.

In this embodiment, the cutting segments are attached to the second end section 18 in a manner such that the cutting segments 30 simultaneously radially extend over the edges (i.e., inside radius 39 and outside radius 40) of the second end section 18; both in towards the opening 22 and radially out away from the opening. That is, the cutting segments are attached so that the outside face 54 of the cutting segments extends outside and hangs over the outside radius 40 of the body 12; and the inside face 55 of the cutting segments extends inside and hang over the inside radius 39 of the body 12 at the second end section 18. In this way, the cutting segments can create a kerf in the drilled material that is wider than the drill bit body. This configuration can be seen in FIGS. 1-7, and 13.

Figure 4:
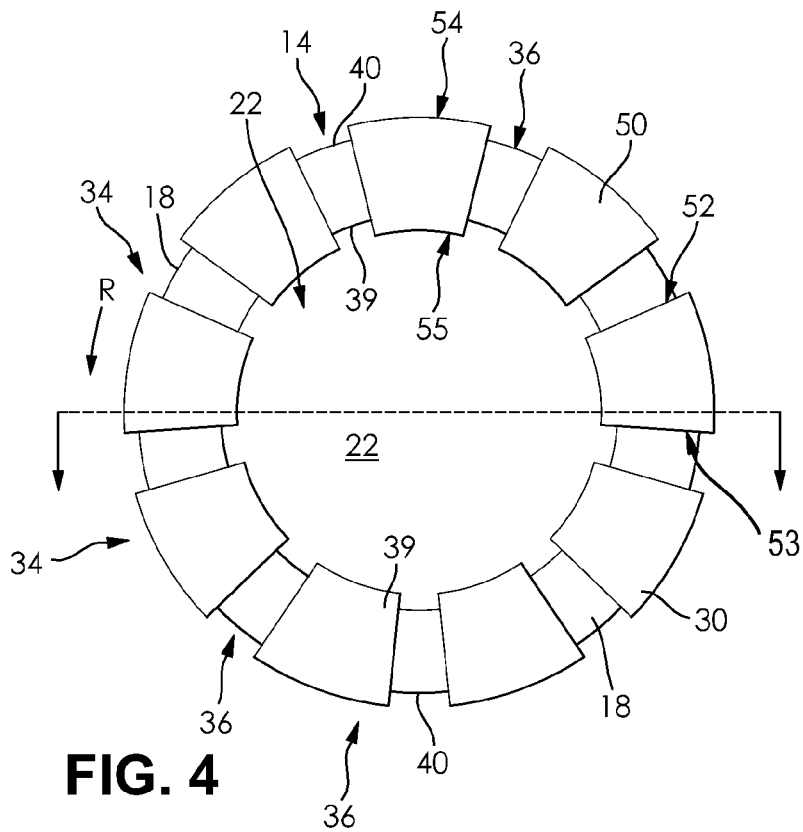
FIG. 4 is an end view of a mining drill bit taken along line 4-4 of FIG. 3.

In an exemplary embodiment and with continued reference to the drawing figures, in particular to FIG. 4, each of the plurality of cutting segments 30 is circumferentially spaced apart substantially evenly on the second end section 18 to define alternating cutting segment regions 34 and gap regions 36 of the cutting head 14. It will be appreciated that it is not necessary for the cutting segments 30 to be evenly spaced apart, but only that the cutting segments 30 have space between them on the second end section 18 to define gap regions 36 on the cutting head 14.

The distance between adjacent cutting segments, which defines each gap region 36, is the average of measurements between one cutting segments and an adjacent cutting segment. As shown in one embodiment and as depicted in FIGS. 1-4, a total of nine (9) cutting segments 30 are provided. More or less segments may be used as necessary or desired. In one aspect, the length of the cutting segments is about 1.1 to about 5.0 times the distance between adjacent cutting segments that define the gap regions 36 on the cutting head 14. In a particular aspect, the length of the cutting segments 30 is about 1.2 to about 3 times the gap region 36 on the cutting head 14.

The cutting segments 30 can comprise almost any metal including a mixture of metals such as, for example, one or more of molybdenum, silver, iron, copper, cobalt, and alloys of such metals, and metal carbides, and mixtures thereof, along with diamonds. In one embodiment the cutting segments comprise a mixture of about 30% iron, 30% copper, 30% cobalt, 10% tungsten carbide by weight of the metal mixture. The cutting segments 30 further include diamond particles/grit/powder dispersed therein at about 0.01-90% by weight of the cutting segments. In one particular aspect, the cutting segments comprise at least about 2% diamond particles by weight. In another particular aspect, the cutting segments comprise from 3% to about 80% by weight of diamond particles.

Figure 13:
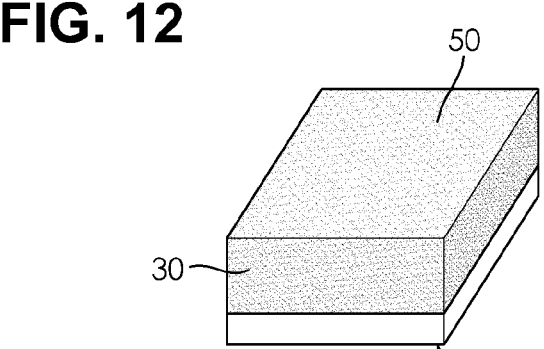
FIG. 13 is a schematic perspective view of a cutting segment showing diamond concentration within the cutting segment.

In one embodiment the cutting segments 30 each have two or more portions having varying concentrations of diamond particles dispersed therein. In one particular aspect as shown in FIG. 13, a cutting segment 30 has two portions having different diamond particle concentrations therein. The cutting segment in FIG. 13 has a top face 50 and a bottom face 51. A first portion of the cutting segment closest to the top face 50 has a higher concentration of diamond particles dispersed therein. A second portion of the cutting segment closest to the bottom face 51 has a lower concentration of diamond particles dispersed therein.

In one aspect, the first portion comprises diamond particles from about 0.01-90% by weight of the first portion, and the second portion is substantially free of diamond particles. In this aspect, the second portion, which comprises the bottom face 51, is attached to the second end section 18 of the drill bit body 12 when the drill bit 10 is constructed. In other words, when the drill bit is constructed, the cutting segment depicted in FIG. 13 will be placed on the drill bit body 12 so that the first portion—having the higher concentration of diamond particles—is located furthest from the second end section 18 of the body 12 so that it may come into contact with the associated material during drilling operations. Consequently, the second portion having the lower concentration is located closest to the second end section 18. A lower concentration of diamond particles in the second portion of the cutting segments may produce a stronger weld between the cutting segment and the drill bit body, wherein diamond particles may not interfere with the strength of the weld. In embodiments where the cutting segments have protrusions 56, the protrusions 56 may be formed in the second portion of the cutting segments that is substantially free of diamond particles.

It will also be appreciated that although lines are shown in FIG. 13 to distinguish the two portions of the cutting segment having various diamond concentrations, in reality, such portions are structurally continuous and such portions can only be distinguished by their differential concentration of diamond particles.

The concentration and arrangement of diamond particles—as well as the relative amount of other components, for example the percentage of each metal in the mixture—can be varied between different portions of the cutting segments. Other compositions may be utilized as well.

The segments 30, which may be pressed and sintered segments, can be produced in a conventional manner using care to control the weight percentage of diamond particles to attain an intended concentration within each portion. More particularly, in one embodiment the diamond particles at a desired concentration are first mixed or dispersed into metal powder, such as, for example, a conventional cobalt-iron-bronze alloy powder. Tungsten carbide and other abrasives or cutting materials may also be added to the mixture. A different mixture(s) is then prepared for a portion(s) that is to have a different diamond concentration(s) compared to the first so as to provide greater or lesser concentration of diamonds in the various portions of the cutting segments 30. The different mixtures are then placed in a graphite mold so as to form the segments 30 having the different portions of various concentrations of diamond particles. The material in the mold is then pressed and fired and/or sintered to form the segments 30. The segments 30 are then attached to the annular second end section 18 of the body 12 by welding.

The segments may be produced in a conventional manner using conventional means, and include a dispersion of diamonds with a particle size of between 10/80 US Mesh and about 20/80 US Mesh. This designates a diamond particle size such that about 10 to about 4,000 of such particles are equivalent to one karat.

In another embodiment, the diamonds are systematically arranged within each portion of the cutting segments. The arrangement of diamond particles may be attained by spacing the diamond particles at regular intervals in a predetermined pattern such that they form a three-dimensional grid within the mass of the cutting segments. A substantially uniform grid of diamond particles within each portion of the cutting segments may thus be produced. The grid pattern and/or particle spacing may be modified within each portion of the cutting segments to produce portions having varying diamond concentrations.

Reamer

Referring now to FIGS. 1, 2, 9, and 10-12 there is shown a driver or reaming tool 100 suitable for use with the core drill bit 10 in the combination mining tool 1. Reamer 100 is conventional in nature having a hollow cylindrical reamer body 105 having a plurality of reaming segments 115 attached to a mid-section 122 of the body 105. The body 105 can be commonly formed of steel as is conventional in the mining drill industry. The reamer has a first end 112, and as shown in FIGS. 8, 9, 10, and 12 can have a female threaded portion adapted for receiving pipe extensions or for being attached to an associated driver. The reamer body has an outside radius and an inside radius, the difference between the outside radius and the inside radius defining a thickness of the reamer body.

When separate and distinct from the drill bit 10, the reamer 100 also has an opposite second end 110. The second end 110, which may comprise a male threaded portion, is adapted to removably connect with the corresponding threaded portion 28 of the first end section 16 of the drill bit 10.

In relation to the direction of rotation R, the reaming segments 115 each have a top face 150, bottom face 151, a leading face 152, a trailing face 153, a down-hole face 154, and an up-hole face 155 as shown in FIGS. 1, 2, 8, 9, and 11. The plurality of reaming segments 115 are disposed along the outside of reamer body 105 at mid-section 122 and are spaced apart to create reaming segment regions 140 and gap regions 141 on the reamer 100.

Figure 9:
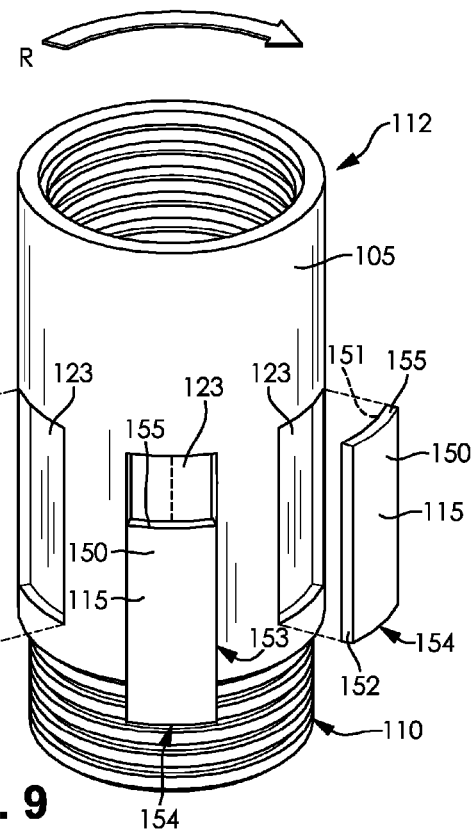
FIG. 9 is an exploded schematic perspective view of a reamer made in accordance with the present subject matter.
Figure 10:
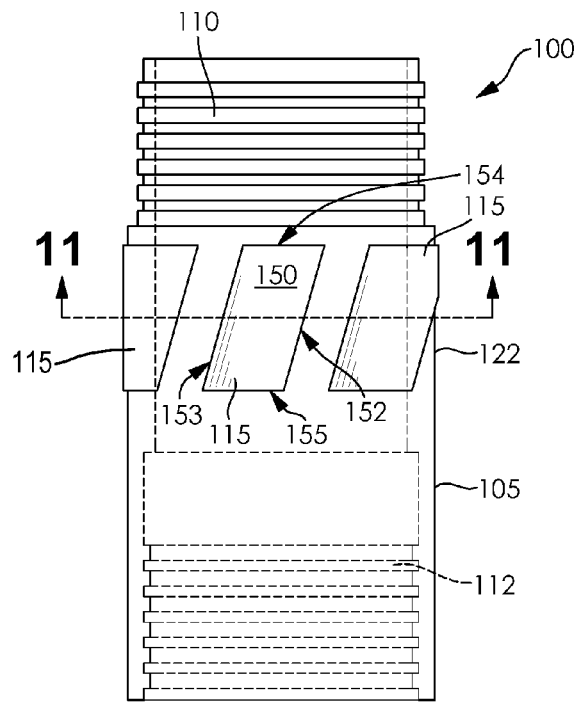
FIG. 10 is a side view of a reamer taken along line 10-10 of FIG. 8.
Figure 11:
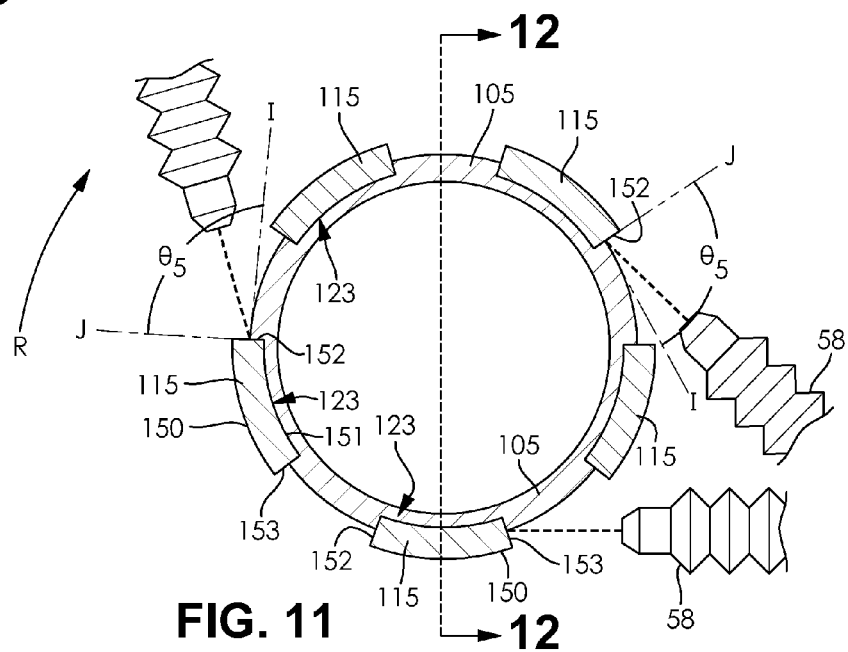
FIG. 11 is a cross-sectional view of a reamer taken along line 11-11 of FIG. 10 showing reaming segments being laser welded to the reamer body.
Figure 12:
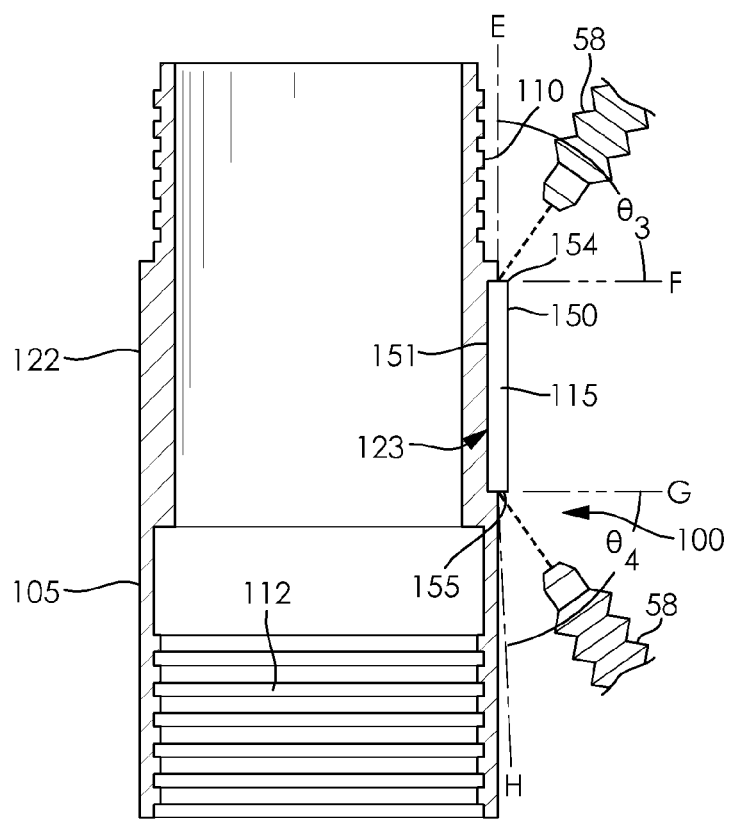
FIG. 12 is a cross-sectional view of a reamer taken along line 12-12 of FIG. 11 showing a reaming segment being laser welded to the reamer body.

In one embodiment, the mid-section 122 of the body 105 includes depressions 123 formed in an outside surface thereof, as shown for example, in FIGS. 9, 11, and 12. The depressions 123 are configured in size and shape so that a portion of the reaming segments 115 sits within the depressions 123 and below (i.e. radially inside) the outside surface of the mid-section of the reamer body. The reaming segments 115 and depressions 123 are configured to be of substantially similar size and shape such that when the reaming segments are welded onto the mid-section 122, the reaming segments are supported in the depressions 123 against forces exerted thereon during drilling operations. The depressions 123 have a depth defined by the average measurement from the outside surface of the mid-section to the base of the depression.

The reaming segments 115 have a height, a width, and a length measurement. When referring to the height of the reaming segments, it is meant the average of the largest and smallest measurements between the top face 150 and the bottom face 151. When referring to the width of the reaming segments, it is meant the average of the largest and smallest measurements between the down-hole face 154 and the up-hole face 155. When referring to the length of the reaming segments, it is meant the average of the largest and smallest measurements between the leading face 152 and the trailing face 153. It will be understood that respective opposite faces of the reaming segments, i.e. top and bottom, down-hole and up-hole, and leading and trailing, can be but are not necessarily parallel to each other, and the reaming segments can be irregularly shaped in accordance with the present subject matter, such as having a major dimension, i.e. the top face 150, being a parallelogram as shown in FIG. 1. The shape and dimensions of the reaming segments are generally configured to meet the desired reaming application.

In one embodiment, the reaming segments have a height that is greater than a depth of the depressions such that a portion or the reaming segments protrudes from the outside surface of the reamer body 105 at the mid-section. In other words, the reaming segments 115 protrude radially out from the depressions and extend past the outside radius of the reamer body 105 at the mid-section. In this regard, the portion of the reaming segments 115 that protrude out from the depressions 123 act to ream or widen a hole drilled in an associated material so that the reamer can easily pass through the hole. In one aspect, the reaming segments 115 protrude from the outside surface by about 2-20% of a thickness of the reamer body 105 at the mid-section 122. In another aspect, the reaming segments 115 protrude by about 5-10% of a thickness of the reamer body 105 at the mid-section 122.

In one embodiment, the depressions 123 are milled or machined into the reamer body 105. In another embodiment, the depressions 123 are integrally cast into the reamer body 105. The depressions are not limited to those rectangular shapes depicted in FIG. 9, but can have any shape so as to correspond to the shape of the reaming segments.

In one embodiment, the reaming segments can be curved, such as that shown in FIG. 9, so as to correspond to the curvature of the reamer body 105. In another aspect, the reaming segments can be flat on one or more faces.

Figure 14:
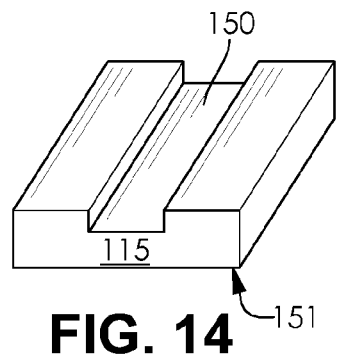
FIG. 14 is a schematic perspective view of a reaming segment having a formation on a top face.
Figure 15:
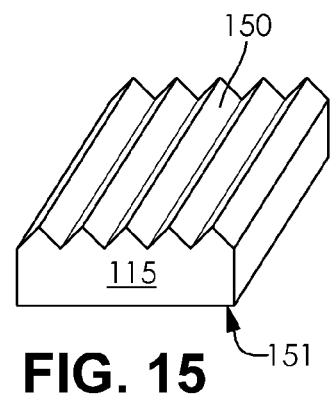
FIG. 15 is a schematic perspective view of a reaming segment having a formation on a top face.

In one embodiment, the reaming segments 115 have a top face 150 with a surface other than a smooth surface as shown in FIGS. 14 and 15. More particularly, the top face 150 can incorporate features that allow drilling fluids located in the annulus between the outside surface of the reamer and the associated drilled material, to more easily flow past the reaming segments. FIGS. 14 and 15 are non-limiting examples showing the reaming segments 115 having a top face 150 with the varying features. During drilling operations, the top face 150 of the reaming segments 115 comes into contact with the sides of a drilled hole, while also allowing the passage of drilling fluids up the annulus and past the reaming segments 115. It is contemplated that the top face 150 can have various other surface shapes or features not limited by the examples provided herein.

Although reaming segments 115 differ in shape from the segments 30 of bit 10, they have a similar chemistry as cutting segments 30 previously mentioned herein, and comprise a metal or a mixture of metals that may comprise silver, molybdenum, tungsten, iron, copper, cobalt and carbides, including alloys and mixtures thereof, and diamonds. The reaming segments 115 also have similar diamond dispersion configurations as discussed herein with regard to the cutting segments 30 and as depicted in FIG. 13. In this aspect, reaming segments 115 may have a portion closest to the bottom face 151 that is substantially free of diamond particles in order to produce a stronger weld with the reamer body 105.

Other aspects of the reaming segments are contemplated to be similar to those that have been discussed herein in relation to the cutting segments, but adapted to the reaming segments for a reamer.

The claimed invention has been described in connection with the exemplary embodiments. However, it is to be appreciated that the embodiments of the invention have use in equipment other than mining equipment, and in other applications such as drilling concrete, asphalt, masonry and related materials. Obviously, alterations and changes may occur to those of ordinary skill in the art upon a reading and understanding of this specification and any appended claims.

Combination core drill bits and reamers of the various embodiments exhibit truer cuts, better tracking and a longer life as compared to conventional bits and reamers which include cutting segments having uniform diamond dispersion attached to the tool body using brazing, infiltration or other techniques.

Methods

Methods of making the combination mining tool 1 in accordance with the present subject matter include laser welding of cutting segments 30 and reaming segments 115 on to the tool 1.

The method includes providing a drill bit body, a plurality of cutting segments, a reamer body, and a plurality of reaming segments. The drill bit body, the plurality of cutting segments, the reamer body, and the plurality of reaming segments have been previously described herein. In the methods described herein, the attaching portion of the cutting segments are brought into proximity to the second end section of the drill bit body and welded thereto. The reaming segments are brought into proximity to the mid-section of the reamer body and laser welded thereto. It will be appreciated that in addition to laser welding, the cutting segments 30 and the reaming segments 115 may be first capacitive discharge welded to the tool, followed by laser welding, so as to form a hybrid weld for attaching the segments 30, 115 to the tool.

As shown in FIGS. 6a-6e, in accordance with several embodiments of the present subject matter, welding produces various welding configurations between the cutting segments 30 and the drill bit body 12. In one embodiment shown in FIG. 6a, capacitive discharge welding is used to attach the cutting segments 30 to the drill bit body 12 and produces a capacitive discharge weld 207. A plurality of current concentrators 26 are disposed on a surface of the second end section 18 of the body 12. The current concentrators 26 act to concentrate an electrical current during the capacitive discharge welding. The concentrated electrical current efficiently facilitates the attachment of the cutting segments 30 to the body 12.

Figure 6A:
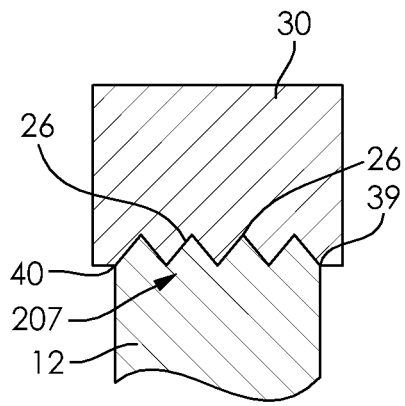
FIGS. 6a-6e are cross-sectional views of a portion of a mining drill bit taken from dotted circle FIG. 6 of FIG. 5.
Figure 6B:
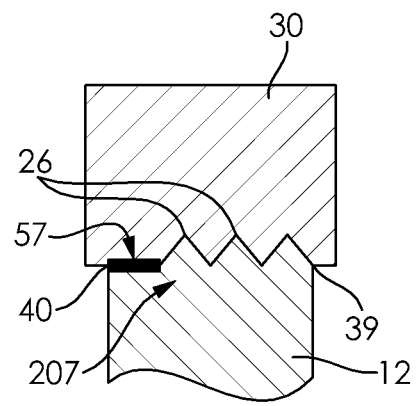
Figure 6C:
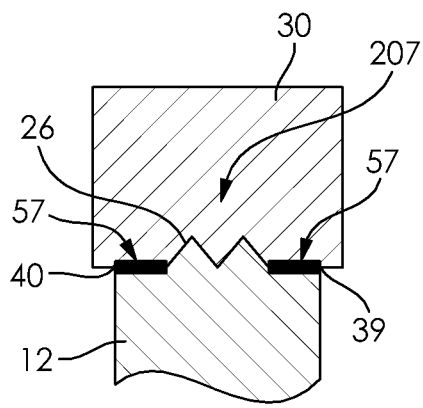

The current concentrators 26 taper to a point or edge. It is to be appreciated that, in accordance with one method of making a core drill bit in accordance with the present invention, the current concentrators act to channel and thereby concentrate current flowing between the drill bit body 12 and the cutting segments 30 during the capacitive discharge welding process. In one embodiment, the form of the tool body 12 is cylindrical and, accordingly, the current concentrators 26 define a plurality of concentric ridges that taper to a point and which are on the surface of the second end section 18 as shown in FIGS. 6a-6c. Other forms of current concentrators at the interface between the cutting head 14 and the body 12 may be utilized as necessary, or desired, such as, for example, a plurality of spaced apart raised portions, such as for example, pegs that taper to a point, a plurality of radially extending ridge portions that taper to a pointed edge, or other shapes, patterns, or configurations provided on the second end section 18 to define the current concentrators 26.

In another embodiment, the cutting segments 30 are welded to the second end section 18 both by capacitive discharge welding and by laser welding as shown in FIGS. 6b and 6c. In these embodiments, the cutting segments 30 are first attached by capacitive discharge welding to the second end section 18 to form a capacitive discharge weld 207. Thereafter, a conventional laser welder is used to further weld the cutting segments 30 to the body 12 to thereby form a laser weld zone 57. The laser welding further reinforces the attachment between the cutting segments 30 and the second end section 18 by melting the material forming the cutting segments and/or the material forming the drill bit body and mutually infusing the melted material between the cutting segments and drill bit body. In FIG. 6b, the capacitive discharge weld 207 is located at the inside radius 39 and the laser weld 57 is located at the outside radius 40. In FIG. 6c, the capacitive discharge weld 207 is located between the inside radius 39 and the outside radius 40 and the laser weld 57 is located at both the inside radius 39 and the outside radius 40. It will be understood that the embodiments described herein, the laser weld 57 can overlap a portion of the capacitive discharge weld 207, or can overlap the entire capacitive discharge weld 207, to thereby form a hybrid weld zone.

Figure 6D:
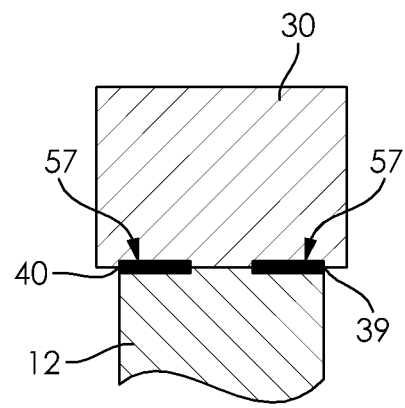
Figure 6E:
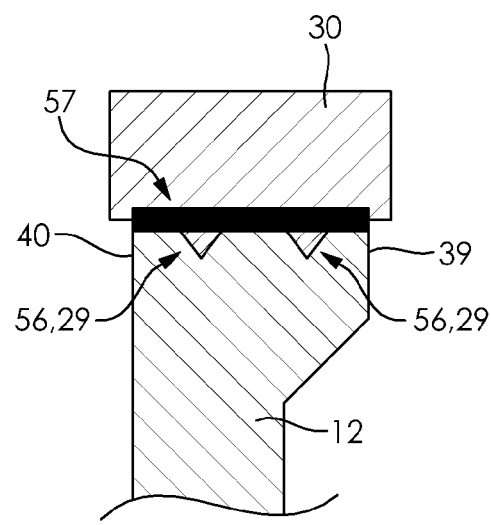

In another embodiment, as shown in FIGS. 6d and 6e, the cutting segments 30 are attached to the second end section 18 of the drill bit body 12 only by laser welding. In these embodiments, laser welding produces a laser weld zone 57 at an interface between the second end section 18 and the connecting portion 38. It will also be understood in regard to the reamer, that laser welding can also be utilized to produce a laser weld area at an interface between the reaming segments and the mid-section.

In one embodiment, laser energy is directed at the interface between the connecting portion 38 and the second end section 18 such that the laser energy enters the interface from the inside radius 39 of the second end section. This is depicted in FIG. 5 showing a laser 58 positioned inside the hollow cylindrical drill bit body 12 and pointed such that laser energy enters the interface between the cutting segments 30 and the second end section 18 from the inside radius 39 of the second end section 18. It will be understood that the laser 58 itself, does not necessarily have to be positioned inside the drill bit body 12 in order that laser energy enter the interface from the inside radius. Rather, the laser can be positioned at a location other than inside the drill bit body, while still delivering laser energy to the interface from the inside radius.

As shown in FIG. 5, laser 58 directs laser energy to the interface from the inside radius 39 of the second end section 18, at any angle $\theta_1$ ranging from dotted line A to dotted line B. Angle $\theta_1$ spans from the inner surface of the drill bit body 12 to the bottom face 51 of the cutting segment 30. As depicted, angle $\theta_1$ may be slightly less than 90°. It will be appreciated that angle $\theta_1$ can be more or less than that depicted depending on the relation of the inside surface of the drill bit body to the bottom face of the cutting segment.

In another embodiment, laser energy is directed at the interface between the connecting portion 38 and the second end section 18 such that the laser energy enters the interface from the outside radius 40 of the second end section 18. This is depicted in FIG. 5 showing a laser 58 positioned outside the hollow cylindrical drill bit body 12 and pointed such that laser energy enters the interface between the cutting segments 30 and the second end section 18 from the outside radius 40 of the second end section 18. Laser 58 directs laser energy to the interface from the outside radius 40 of the second end section 18, at any angle $\theta_2$ ranging from dotted line C to dotted line D. Angle $\theta_2$ spans from the outside surface of the drill bit body 12 to the bottom face 51 of the cutting segment 30. Similar to angle $\theta_1$, angle $\theta_2$ may be about 90°, but can be more or less than that depicted in FIG. 5.

In another embodiment, laser energy enters the interface from both the inside and outside radius of the second end section. It will be appreciated that laser energy can also be directed at the interface adjacent to the leading 52 or trailing faces 53 of the cutting segments.

In one aspect as shown in FIG. 6e, the laser weld zone 57 produced by the methods described herein, occupies the entire interface between the second end section 18 and the connecting portion 38 of the cutting segments 30. That is, the laser weld zone penetrates 100% of the thickness of the drill bit body at the second end section. In another aspect as shown in FIG. 6b-6d, the laser weld zone 57 does not occupy the entire interface but only occupies a portion of the interface between the second end section 18 and the connecting portion 38 of the cutting segments 30. In FIGS. 6c and 6d, the laser weld zone 57 comprises two laser weld zones, one at the outside radius 40 of the second end section 18 and one at the inside radius 39 of the second end section 18. Such configuration—having two laser weld zones 57, is made by laser energy entering the interface from both the inside and outside radii of the second end section. In one aspect the laser weld zone 57, whether comprising one or two laser weld zones at the interface of the cutting segments and the second end section, penetrates a total of about 10% to about 50% the thickness of the drill bit body at the second end section.

In FIG. 6e, therein is shown a cutting segment 30 having two protrusions 56 and a drill bit body 12 having two corresponding recesses 29. The drill bit has one laser weld zone 57 occupying the entirety of the interface between the cutting segments 30 and the drill bit body 12. The laser weld zone intersects the mated plurality of protrusions 56 and recesses 29, and thereby allows a relatively large amount of material from the cutting segments to integrate with a relatively large amount of material from the drill bit body. It will be understood that in accordance with the present subject matter, the weld zone could be a single weld zone occupying all of the interface between the cutting segments and the drill bit body, wherein the laser weld zone 57 intersects a all of of the plurality of mated protrusions 56 and recesses 29. Alternatively, the weld zone could be two or more laser weld zones 57 occupying a portion of the interface between the cutting segments 30 and the drill bit body 12, wherein the laser weld zones 57 intersects a portion of the plurality of mated protrusions 56 and recesses 29.

In another embodiment as shown in FIGS. 7a and 7b, the method includes providing cutting segments 30 that have one or more protrusions 56 that protrude from the connecting portion 38. When the cutting segments are brought into proximity to the second end section, the protrusions 56 are mated with one or more correspondingly shaped and sized recesses 29 in the second end section 18, such that the protrusions fit snugly in the recesses. In one aspect as shown in FIG. 6e, laser welding includes forming the laser weld zone 57 at the interface so that the laser weld zone 57 includes at least a portion of the one or more protrusions 56 and at least a portion of the one or more recesses 29.

In one embodiment, the protrusions comprise a pointed ridge projecting outwardly from a plane of the connecting portion and the one or more recesses comprise a pointed groove in a plane of the second end section. In one aspect, the pointed groove extends annularly around the second end section and accepts the pointed ridge on each of the plurality of cutting segments. In another aspect, a plurality of pointed grooves radially extend from the inside radius to the outside radius of the second end section and each groove accepts the pointed ridge from one of the plurality of cutting segments.

In one embodiment in regard to the reamer 100, the method includes forming a plurality of depressions 123 in the mid-section of the reamer body as depicted in FIG. 9. The depressions are as previously described herein. When the reaming segments 115 are brought into proximity with the mid-section, each one of the reaming segment 115 is positioned and mated with one correspondingly shaped and sized depression 123 in the mid-section 122, such that the reaming segments closely fit, and sit within the depressions. Laser welding includes forming the laser weld area at the interface between the cutting segments and the mid-section. Each of the reaming segments protrudes a radial distance outwardly from the outside surface of the mid-section by about 5% to about 10% the thickness of the reamer body at the mid-section. In one aspect, the recesses are milled into the mid-section. In another aspect, the recesses are integrally formed into the mid-section.

In one embodiment, the laser weld area occupies a portion of the interface between the reaming segments and the mid-section that the laser weld is adjacent to the leading face 152 and the trailing face 153 of the reaming segments 115. The formation of the laser weld area at these locations is depicted in FIG. 11, showing laser 58 directing laser energy at the leading face 152 and the trailing face 153 of each reaming segment 115.

In another embodiment, the laser weld area occupies a portion of the interface between the reaming segments and the mid-section that is adjacent to the down-hole face 154 and the up-hole face 155 of the reaming segments. The formation of the laser weld area at these locations is depicted in FIG. 12, showing laser 58 directing laser energy at the down-hole face 154 and the up-hole face 155 of each reaming segment 115.

In another embodiment, the laser weld area occupies a portion of the interface between the reaming segments and the mid-section that is adjacent to one or more of the leading face, the trailing face, the down-hole face, and the up-hole face of the reaming segments.

As with the drill bit, the laser energy used to attach the reaming segments to the reamer body can approach the interface at an angle as depicted in FIGS. 11 and 12. In FIG. 11, angle $\theta_5$ spans between dotted line I and dotted line J. In FIG. 12, angle $\theta_3$ spans between dotted line E and dotted line F, and angle $\theta_4$ spans between dotted line G and dotted line H.

In another embodiment as depicted in FIGS. 6b and 6c, the method includes forming a dual weld at the interface between the cutting segments and the drill bit body. In this embodiment, the cutting segments 30 are first attached by capacitive discharge welding to the second end section 18 to form a capacitive discharge weld 207. Thereafter, a laser welder is used to further weld the cutting segments 30 to the body 12 thereby forming a laser weld 57. The laser welding further reinforces the attachment between the cutting segments 30 and the second end section 18. It will be understood that this combination of welding techniques can be used to form a hybrid weld zone, wherein the laser weld 57 overlaps from a portion to all of the capacitive discharge weld 207.

In one embodiment, the cutting and reaming segments are attached one at a time; however, it will be appreciated that it may be possible to weld two or more, or possibly all of the segments at once. Thereafter, the welds are heat treated to improve their strength. In one embodiment, the welds are heat treated after the cutting segments are mounted to the drill bit body. Heat treating relieves any residual stress in the weld joint and makes the weld stronger The laser used to generate the laser energy can be a type conventionally used and well known by those having ordinary skill in the art. In one embodiment, the laser outputs about 100-700 watts per millimeter of penetration of the weld at the interface between the cutting segments and the second end section or between the reaming segments and the mid-section.

Working Example

The following is provided for example and not for limiting the scope of the present subject matter. In this example, a hollow cylindrical drill bit body, nine cutting segments, a hollow cylindrical reamer body, and six reaming segments were provided. The drill bit body had an internal thread at one end to selectively connect to an external thread on one end of the reamer body. The cutting segments each had diamonds dispersed therein with a portion adjacent to the bottom face being substantially free of diamonds. Each cutting segments also had an inverse V-shaped ridge on the bottom face that extended from the leading face to the trailing face. The inverse V-shaped ridge was centered on the bottom face between the outside face and the inside face. The drill bit body had a radially centered V-shaped groove extending annularly around the end face (i.e. second end section 18) of the drill bit body. The V-shaped groove on the drill bit body and inverse V-shaped ridge on the cutting segments were correspondingly sized so that, when the cutting segments were brought together with the drill bit body, the inverse V-shaped ridges fit inside the V-shaped groove.

The cutting segments were circumferentially spaced on the end face of the drill bit body and laser welded thereto. A laser was inserted inside the hollow of the drill bit body. From this position, laser energy was directed toward the interface between each cutting segment and the drill bit body to thereby form a laser weld at the inside radius of the interface. The laser was then positioned outside the drill bit body. From this position, laser energy was directed toward the interface between each cutting segment and the drill bit body to thereby form a laser weld at the outside radius of the interface. The laser welds intersects a portion of the interface where the inverse V-shaped ridge mated with the V-shaped groove.

The reamer body had six depressions circumferentially spaced on an outside surface thereof at a mid-section between one end of the reamer body and the other. The depressions had a shape corresponding to the shape of the reaming segments such that one reaming segments mated with and fit in one depression. The reaming segments had a height that was greater than the depth of the depressions such that when the reaming segments were placed in the depressions, a portion of the reaming segments extended past the outside surface of the reamer body.

A laser was used to direct laser energy at the interface between the reaming segments and the reamer body. In this example, a laser weld was formed at the periphery of each reaming segments. In other words, a laser weld was formed at the interface between the leading face, the trailing face, the up-hole face, and the down-hole face of the reaming segments, and the edge of the depression as shown in FIGS. 11, and 12.

In the subject embodiment, by way of example only and not for purposes of limiting the various embodiments, the cylindrical body 12 has an outside diameter of about 3.0 inches and a longitudinal length of about 2.375 inches. In another embodiment, the cylindrical body 12 has an outside diameter of about 3.700 inches, an inside diameter at the second end section of about 2.750 inches, and a longitudinal length of about 3.769 inches. The cutting segments have a height of about 0.580 inches with a portion substantially free of diamond particles of about 0.100 inches. The cutting segments have a length of about 0.787 inches and a width of about 0.680 inches. The reamer body 105 has an outside diameter of about 3.700 inches, an inside diameter at the mid-section of about 3.062 inches, and a longitudinal length of about 3.5 inches. The depressions are milled into the reamer body and have a depth of about 0.030 inches, a width of about 1.2 inches and a length of about 3.2 inches. The reaming segments have a height of about 0.070 inches, a width of about 1.2 inches, and a length of about 3.2 and thus protrude from the outside surface of the reamer by about 0.040 inches. After laser welding, the cutting segments extend over the outside radius of the drill bit body to provide a kerf during drilling operations. In most applications the reaming segments 115 have a height of about 0.5 to about 4 inches, a width of from about 0.5 to about 2 inches. In most applications the depressions 123 formed in the reaming body are from about 0.020 to about 0.100 inches.

Many other benefits will no doubt become apparent from future application and development of this technology. As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:

1. A method of making a combination mining drill bit and reamer comprising:
   providing a hollow cylindrical drill bit body having a first end section and an opposite second end section, the second end section having a body connecting portion with a body inside extent and a body outside extent with a central connecting region between the inside and outside extents;
   providing a hollow cylindrical reamer body having a first end and an opposite second end and a mid-section between the first end and the second end, the mid-section of the reamer body having a plurality of depressions;
   providing a plurality of cutting segments having diamond particles dispersed therein, the plurality of cutting segments each having a cutting segment connecting portion;
   providing a plurality of reaming segments having diamond particles dispersed therein, the plurality of reaming segments having a top face, an opposite bottom face and an outer perimeter;
   positioning the plurality of cutting segments relative to second end section of the hollow cylindrical body such that the segment connecting portion faces a portion of the body connecting portion;
   laser welding the cutting segments to the second end section of the drill bit body to thereby form a laser weld zone at an interface between the cutting segments and the second end section;
   positioning each of the plurality of reaming segments in a corresponding one of the plurality of depressions in the mid-section of the reamer wherein at least a portion of the reaming segment sits within one of the depressions and as least a portion the reaming segment protrudes from the outside surface;
   laser welding the reaming segments to the reamer body along at least one edge of the outer perimeter to thereby form a reaming laser weld zone at an interface between the reaming segments and the mid-section to maintain the reaming segments in the depressions;
   attaching the first end section of the drill bit body to the second end of the reamer body.

2. The method according to claim 1, wherein the laser weld zone is a first weld zone at the interface between the cutting segments and the second end section; the method further including the step of capacitive discharge welding the cutting segments to the second end section so as to provide a second weld zone, the second weld zone extending inwardly from the first weld zone.

3. The method according to claim 2, wherein:
laser welding the cutting segments to the second end section includes directing laser energy at the interface between the cutting segments and the second end section such that the laser energy enters the interface between the cutting segments and the second end section at the body inside extent to form the first weld zone and further at the body outside extent to form a third weld zone, the second weld zone being between the first and third weld zones.

4. The method according to claim 3, wherein laser energy enters the interface between the cutting segments and the body inside extent from a laser energy source that is positioned inside the hollow cylindrical drill bit body during formation of the first weld zone.

5. The method according to claim 3, wherein the first and second weld zones occupy an entirety of the interface between the cutting segments and the second end section.

6. The method according to claim 3, wherein the first and second weld zones occupy less than an entirety of the interface between the cutting segments and the second end section, the second weld zone extending between the first and third weld zones.

7. The method according to claim 3, wherein each of the cutting segments comprise one or more protrusions and the second end section comprises one or more recesses, the method further comprising:
mating the one or more protrusions on each of the cutting segments with the one or more recesses.

8. The method according to claim 7, wherein the one or more protrusions comprise a pointed ridge and the one or more recesses comprise a pointed groove.

9. The method according to claim 8, wherein the pointed groove extends annularly around the second end section.

10. The method according to claim 8, wherein the pointed groove comprises a plurality of pointed grooves radially extending from the inside radius to the outside radius of the second end section.

11. The method according to claim 7, wherein the cutting segments connecting portions are substantially free of diamond particles.

12. The method according to claim 1, wherein
the plurality of reaming segments each have a leading edge, a trailing edge, a down-hole edge, and an up-hole edge; the leading edge, the trailing edge, the down-hole edge, and the up-hole edge together forming an outer perimeter reamer configuration, the plurality of depressions each having an outer perimeter configuration generally equal to the outer perimeter of the reamer configuration to allow the reaming segments to be positioned at least partially in the depressions, the laser welding the reaming segments step securing the reaming segments relative to the depression.

13. The method according to claim 1, wherein:
the reamer body has an outside radius and an inside radius, the difference between the outside radius and the inside radius defining a thickness of the reamer body; and
the portion of each of the reaming segments that protrudes from the outside surface by about 5% to about 10% the thickness of the reamer body at the mid-section.

14. The method according to claim 1, wherein:
the reaming segments include a leading face, a trailing face, a down-hole face, and an up-hole face; and
the laser weld area occupies a portion of the interface between the reaming segments and the mid-section that is adjacent to at least one of the leading face, the trailing face, the down-hole face, the up-hole face.

15. The method according to claim 1, wherein the top face includes formations such that the top face is not substantially smooth.

16. The method according to claim 1, wherein a portion of each of the plurality of reaming segments that is adjacent to the reaming laser weld zone is substantially free of diamond particles.

17. The method according to claim 1, further including the step of forming the depressions into the mid-section of the reamer body.

18. The method according to claim 17, wherein the plurality of reaming segments each have a leading edge, a trailing edge, a down-hole edge, and an up-hole edge; the leading edge, the trailing edge, the down-hole edge, and the up-hole edge together forming an outer perimeter reamer configuration, the forming step including forming a plurality of depressions each having an outer perimeter configuration generally equal to the outer perimeter of the reamer configuration to allow the reaming segments to be positioned at least partially in the depressions, the laser welding the reaming segments step securing the reaming segments relative to the depression.

19. The method according to claim 18, wherein the laser weld zone is a first weld zone at the interfaces between the cutting segments and the second end section; the method further including the step of capacitive discharge welding the cutting segments to the second end section before the laser welding the cutting segments step, the capacitive discharge welding step both holding the cutting segments relative to the second end section for the laser welding the cutting segments step and providing a second weld zone to strengthen the connection between the cutting segments and the second end section, the second weld zone extending inwardly from the first weld zone.

20. A method of making a combination mining drill bit and reamer comprising:
providing a hollow cylindrical body having a first end section, an opposite second end section and a mid-section, the second end section having a body connecting portion with a body inside extent and a body outside extent with a central connecting region between the inside and outside extents;
providing a plurality of cutting segments having diamond particles dispersed therein, the plurality of cutting segments having a segment connecting portion;
providing a plurality of reaming segments having diamond particles dispersed therein;
attaching the plurality of cutting segments to the second end section of the cylindrical body by capacitive discharge welding thereby joining the segment connecting portion to at least the central connecting region forming a capacitive discharge weld zone;
laser welding the cutting segments to the second end section of the body to thereby form a laser weld zone at an interface between the cutting segments and at least one of the body inside extent and a body outside extent, the capacitive discharge welding zone extending inwardly from the laser weld zone;
welding the reaming segments to the body at the mid-section to thereby form a reaming segment weld zone at an interface between the reaming segments and the mid-section; and, wherein the first end section of the drill bit body is configured to selectively attach to a drill pipe or driver for rotating the combination mining drill bit and reamer relative to an associated material.

21. The method of claim 20, wherein laser welding includes laser welding the cutting segments to the second end section along both the body inside extent and the body outside extent thereby forming an inside laser weld zone and an outside laser weld zone, the capacitive discharge weld zone extending between the inside and outside laser weld zones.

22. The method of claim 20 wherein the reaming segments include a leading edge, a trailing edge, a down-hole edge, and an up-hole edge, the leading edge, the trailing edge, the down-hole edge, and the up-hole edge together forming an outer perimeter reamer configuration, the welding the reaming segments step including laser welding along the interface of at least two edges of the leading edge, the trailing edge, the down-hole edge, and the up-hole edge.

23. The method of claim 20 wherein the reaming segments are first welded to the mid-section by capacitive discharge welding followed by laser welding, so as to form two weld zones; the two weld zones including a laser weld zone and a capacitive discharge weld zone; the capacitive weld zone extending inwardly from the laser weld zone.

24. The method of claim 20 wherein the drill bit and reamer comprise two separate pieces that are attached by a male threaded portion formed in the reamer that is received within a female threaded portion formed in the drill bit.

25. A method of making a mining drill bit comprising:
providing a hollow cylindrical body having a first end section, an opposite second end section and a mid-section, the second end section having a body connecting portion with a body inside extent and a body outside extent with a central connecting region between the inside and outside extents;
providing a plurality of cutting segments having diamond particles dispersed therein, the plurality of cutting segments having a segment connecting portion;
positioning the plurality of cutting segments relative to second end section of the hollow cylindrical body such that the segment connecting portion faces a portion of the body connecting portion;
attaching the plurality of cutting segments to the second end section of the cylindrical body by capacitive discharge welding thereby joining the segment connecting portion to at least the central connecting region;
laser welding the cutting segments to the second end section along both the inside extent of the second end section and the outside extent of the second end section to thereby form a dual weld zone joint between the cutting segments and the second end portion wherein the dual weld zone joint includes a first weld zone formed in the central connecting region by the capacitive discharge welding and a second weld zone formed by the laser welding at an interface between the cutting segments and the second end section.

* * * * *